United States Patent [19]

Marazzi et al.

[11] Patent Number: 5,420,951
[45] Date of Patent: May 30, 1995

[54] LOCKING FIBER OPTIC CONNECTOR RECEPTACLE

[75] Inventors: Silvio Marazzi, Cavigliano; Silverio De Marchi, Contra, both of Switzerland

[73] Assignee: Diamond SA, Losone, Switzerland

[21] Appl. No.: 155,767

[22] Filed: Nov. 23, 1993

[30] Foreign Application Priority Data

Nov. 26, 1992 [CH] Switzerland .................. 03620/92

[51] Int. Cl.6 ............................ G02B 6/00; G02B 6/36
[52] U.S. Cl. .................................................. 385/75
[58] Field of Search ................................. 385/75–83

[56] References Cited

U.S. PATENT DOCUMENTS

| | | | |
|---|---|---|---|
| 4,679,895 | 7/1987 | Huber | 385/81 X |
| 5,054,879 | 10/1991 | Brown | 385/78 X |
| 5,073,046 | 12/1991 | Edwards et al. | 385/78 X |
| 5,117,479 | 5/1992 | Erdman et al. | 385/136 |
| 5,142,599 | 8/1992 | Sakurai et al. | 385/78 |

FOREIGN PATENT DOCUMENTS

| | | |
|---|---|---|
| 119013 | 9/1984 | European Pat. Off. . |
| 468671 | 1/1992 | European Pat. Off. . |
| 2261742 | 5/1993 | United Kingdom . |

*Primary Examiner*—Akm E. Ullah
*Attorney, Agent, or Firm*—Shoemaker and Mattare, Ltd.

[57] ABSTRACT

An engagement device ensures that a plug portion (1) is held, secure against tension, in a sleeve portion (3). The engagement device has at least one locking catch (5) which is able to be engaged behind a locking element (6) when the plug portion is completely inserted. To release the lock, a releasing lever (7) is provided next to the locking element (6), with which the locking catch is able to be disengaged from the locking element. This releasing lever is formed as a double armed lever which is able to pivot on the plug portion. Through that, no excessive force must be exerted onto the sleeve portion in order to withdraw the plug portion.

16 Claims, 4 Drawing Sheets

FIG. 5
FIG. 6
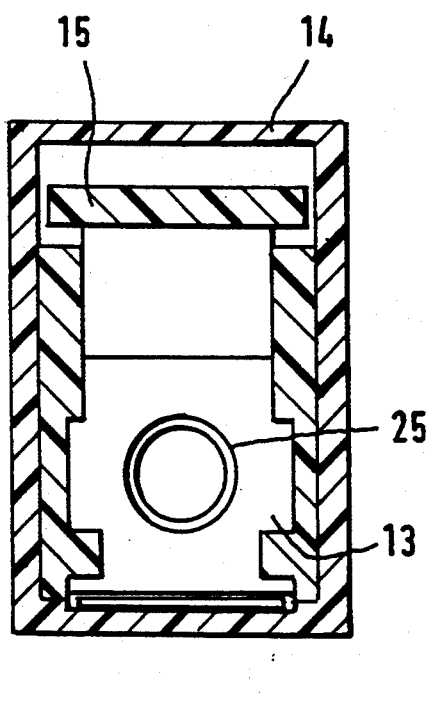
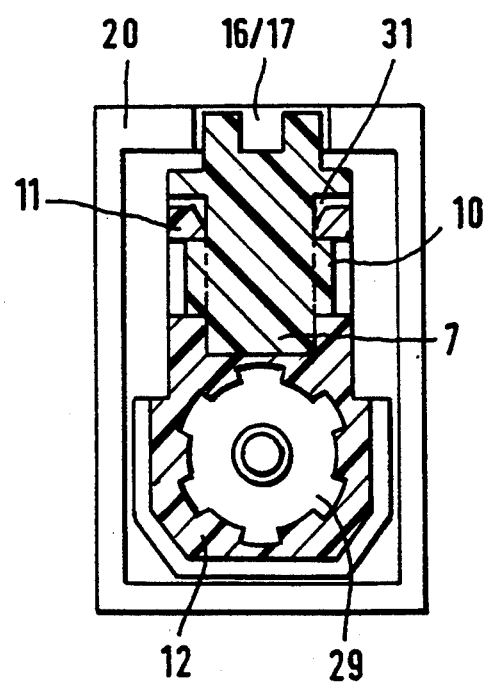

LOCKING FIBER OPTIC CONNECTOR RECEPTACLE

BACKGROUND OF THE INVENTION

The invention concerns a plug connector for an optical fibre. These types of plug connectors with an engagement device offer an alternative to screw threaded plug connectors with which the plug portion is normally fixed with the aid of a coupling ring on the sleeve portion.

A sleeve portion with sprung locking catches is, for example, made known by EP-A-468 671. The plugs for these types of plug connections are the so called push-pull type, with which the plug housing is held to be axially displaceable in relation to the ferrule holder. Through pulling on the plug housing, the locking catches are spread out and the plug can be withdrawn. If, however, there is tension on the cable, the plug cannot be withdrawn from the sleeve portion.

In EP-A-119 013 or from GB-A-2 261 742, plug connectors have also already been made known, with which the locking catch is released by a separately activated releasing element. This is, however, formed as a slider, the releasing force of which opposes the tensile force to withdraw the plug portion.

A disadvantage of known plug connectors is the relatively complicated construction of the plug portion. Apart from that, with push-pull connectors, the tensile force is first of all transferred to the sleeve portion for sufficiently long until the locking catch is fully disengaged. On the other hand, with plugs possessing releasing sliders, an opposed force must first of all be exerted which unnecessarily loads the plug ferrule and hinders handling.

SUMMARY OF THE INVENTION

It is therefore a purpose of the invention to create a plug connector of the type mentioned in the introduction which is simpler in construction and handling and with which the plug portion can be withdrawn without tensile loading or pressure loading on the sleeve portion. In addition, a high degree of operating security should be attained. The releasing lever arranged next to the locking element makes it possible to disengage the locking catch from the locking element without a tensile force being exerted onto the sleeve portion. The forces for release and for withdrawal of the plug are in practice separated from one another, the releasing lever enabling simple handling. The locking catch is arranged on the sleeve portion, the releasing lever being mounted on the plug portion. In accordance with the dimensions of both the lever arms of the double armed lever, a force increase can be attained so that also locking catches with strong spring action can be easily opened.

The releasing lever has preferably a pair of linkage lugs which are able to be engaged in a mounting fork on the plug portion. Through that, mounting of the releasing lever will be considerably facilitated.

The plug portion possesses preferably a plug housing with which the locking element and the mounting fork are formed as one piece. This enables fabrication as an economical plastic injection moulded component. In the same way, the sleeve portion can also possess an inner sleeve housing which is formed in one piece with a sprung tongue on which the locking catch is arranged.

A particularly high degree of operating security can be attained if the releasing lever possesses a key section with a code which comprises protrusions and recesses and if the key section engages in a securing section on the sleeve portion with corresponding code, the key section and the security section being so arranged that the locking catch is only able to be engaged in the case of appropriate code. In this way, for example, it will be avoided that, through confusion, plug components are wrongly inserted into equipment. Since the releasing lever is a separate component, releasing levers with differing codes can be manufactured which can then be assembled on plug portions, according to choice. Preferably, with that also the security section is so designed that it can be easily exchanged. This can be particularly advantageously achieved in that the inner sleeve housing is inserted into an outer sleeve housing, that the inner sleeve housing is secured in the outer sleeve housing by an end section which is affixed to one of the sleeve housings and that this end section is equipped with the security section. The security section fulfils a double function in this way, in that on the one hand it holds both the sleeve housings together and in that on the other hand it carries the code.

Paired codes on the releasing lever and on the security section can be also advantageously distinguishable by means of the same colouring. Since the end sections and the releasing levers are separate components, with the same sleeve portions and plug portions, associated pairs can be easily visually distinguished from those with differing codes.

Further advantages and individual features of the invention arise from the following description of an embodiment, and from the drawings.

BRIEF DESCRIPTION OF THE DRAWINGS

FIG. 5 is a section through the plane I—I according to FIG. 4, and

FIG. 6 is a section through the plane II—II according to FIG. 4.

DESCRIPTION OF THE PREFERRED EMBODIMENT

Figure 1:
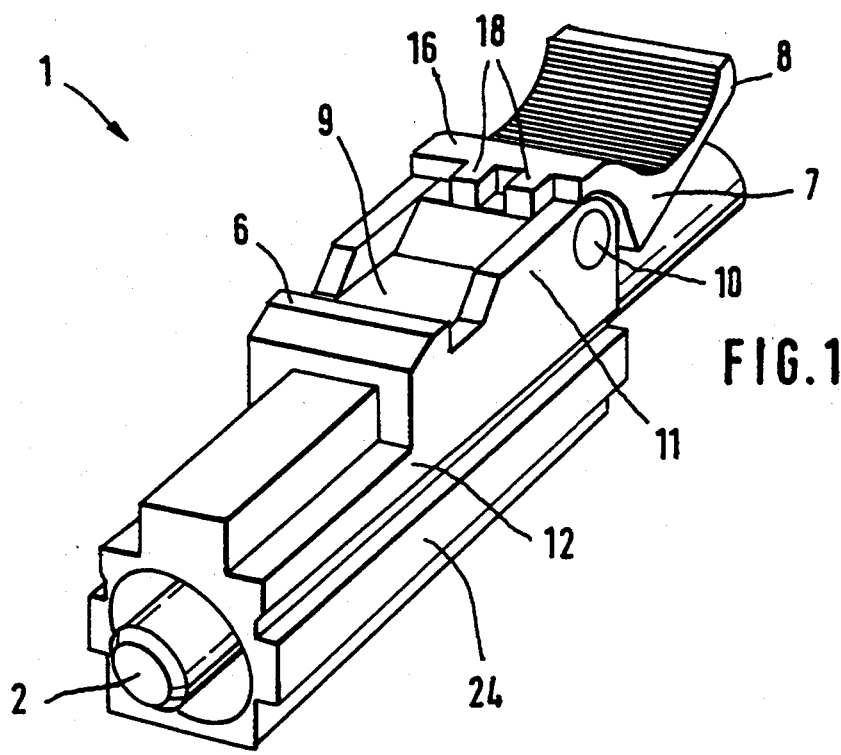
FIG. 1 is a perspective representation of a plug portion.

FIG. 1 shows a plug portion 1 with a plug housing 12 of approximately rectangular cross section which is preferably manufactured from plastic. Lateral guide rails 24 ensure that the plug portion is inserted in the correct position. The plug ferrule 2 protrudes slightly from the plug housing.

On the rear end of the plug housing, a releasing lever 7 is mounted, with the aid of linkage lug 10, to be able to pivot. This releasing lever 7 has a grip piece 8 which, to increase grip, is provided with small grooves. The releasing lever has, in addition, a pivot arm 9 which extends into the region of a transverse locking bar 6. Apart from that, a key section 16, which possesses a certain pattern of protrusions 18, is arranged on the grip piece 8.

Figure 2:
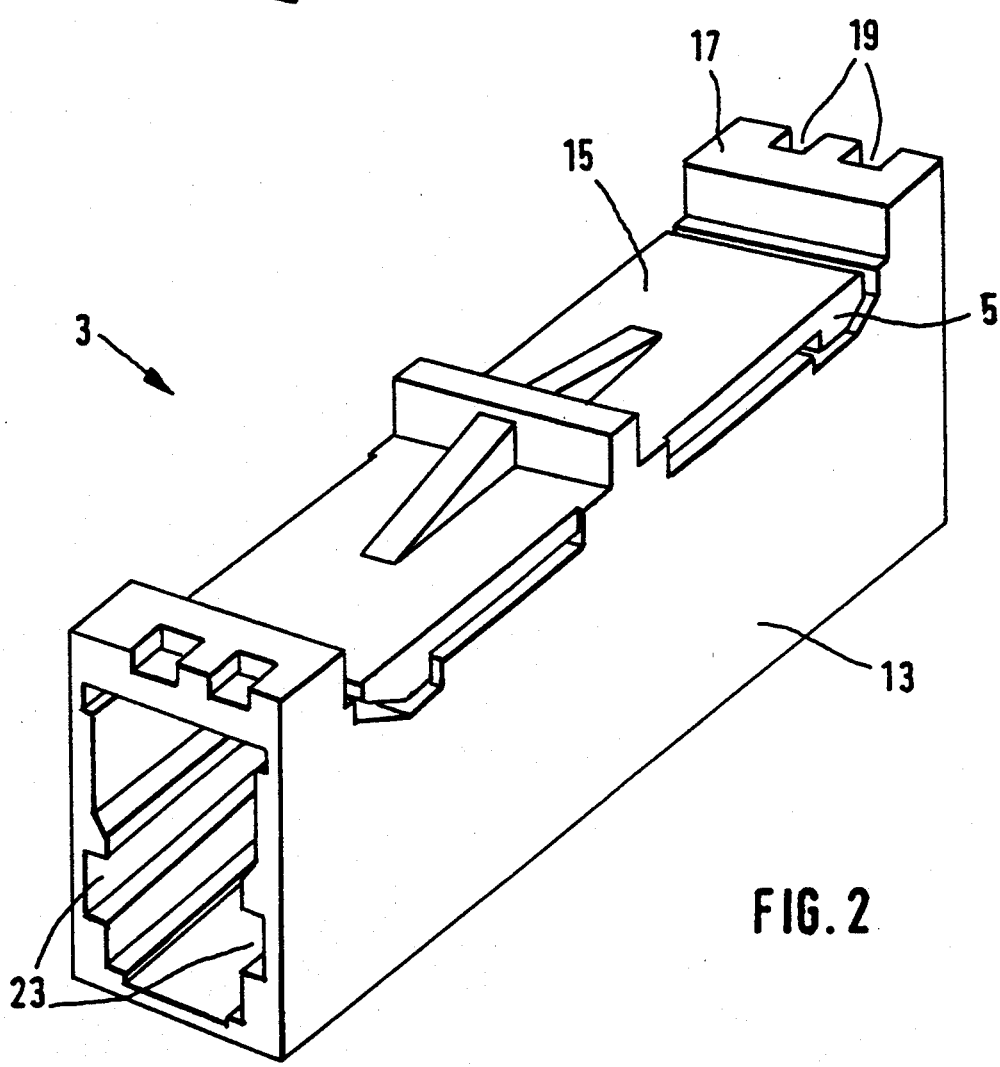
FIG. 2 is a perspective representation of a sleeve portion, shown in a simplified way, for accommodation of a plug according to FIG. 1.

The receptacle 3 according to FIG. 2 is shown in a somewhat simplified form. It comprises, however, in principle, a box type sleeve housing 13 into which a plug portion can be inserted from both sides. With that, so called middle adaptors are as a rule concerned, which, for example, can be mounted on a housing wall. Alternatively, this type of sleeve portion can also be a direct component of a plug housing. As can be seen, for example, from EP-A-468 671 mentioned in the introduction, it is not essential that the same type of plug portions can be inserted from both sides into the middle adaptor. The locking catches could also be arranged only on one side.

In FIG. 2, the lateral guide grooves 23 can be seen, into which the guide rails 24 are led. The upper portion of the plug housing is formed by both the sprung tongues 15, on each end of which a locking catch 5 is arranged. A security section 17, on which recesses are provided which correspond with the protrusions 18 on the plug portion 1, is arranged at each entrance to the sleeve portion. When inserting the plug portion 1 into the sleeve portion 3, the locking catch 5 engages behind the locking bar 6 on the plug portion. This is, however, only possible if the code on the key section 16 corresponds with the security section 17. If the code does not correspond, the plug portion cannot be sufficiently deeply inserted and the plug connection will not be made.

Figure 3:
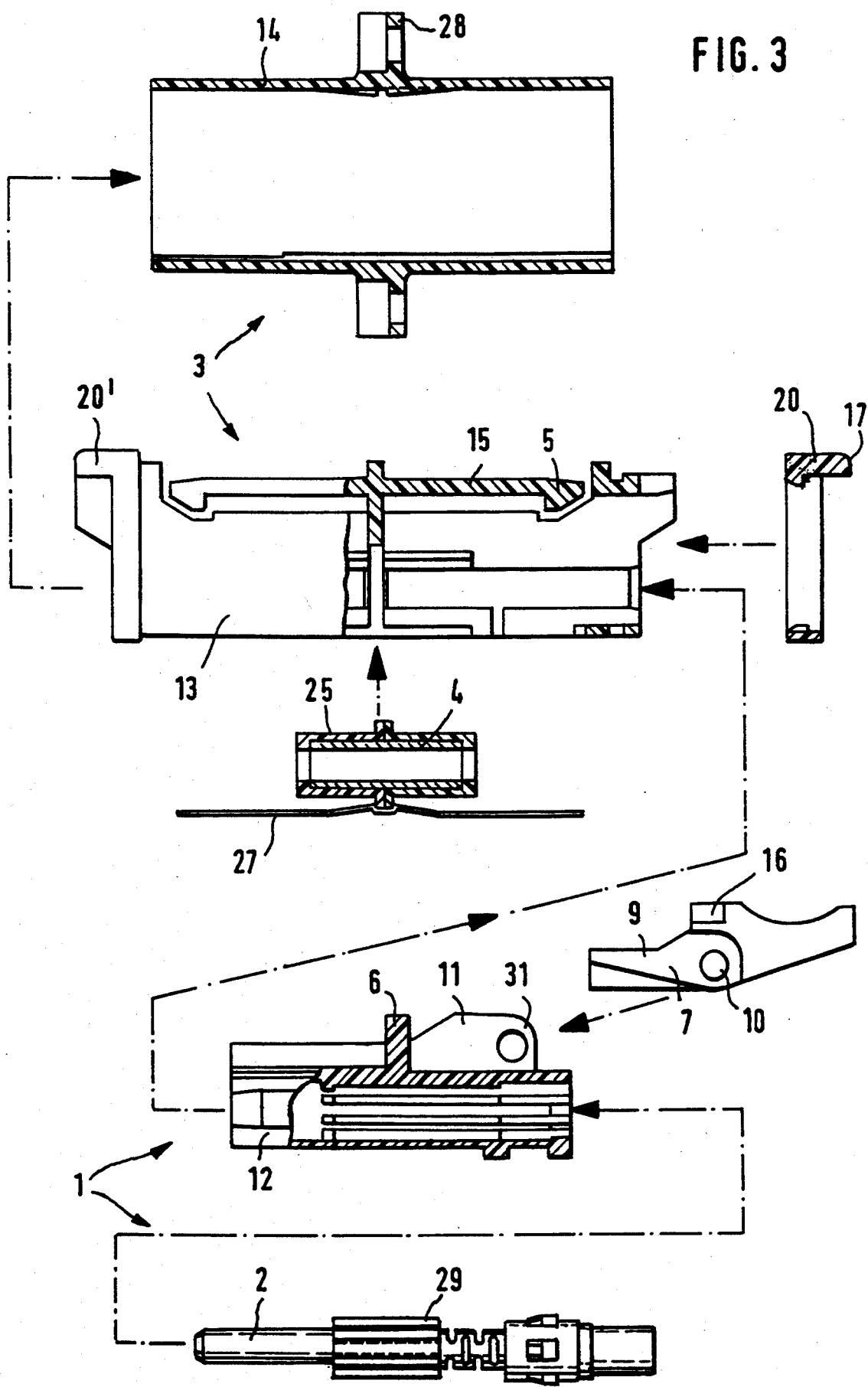
FIG. 3 shows a plug connector, dismantled down to its individual components, possessing the features of the invention.
Figure 4:
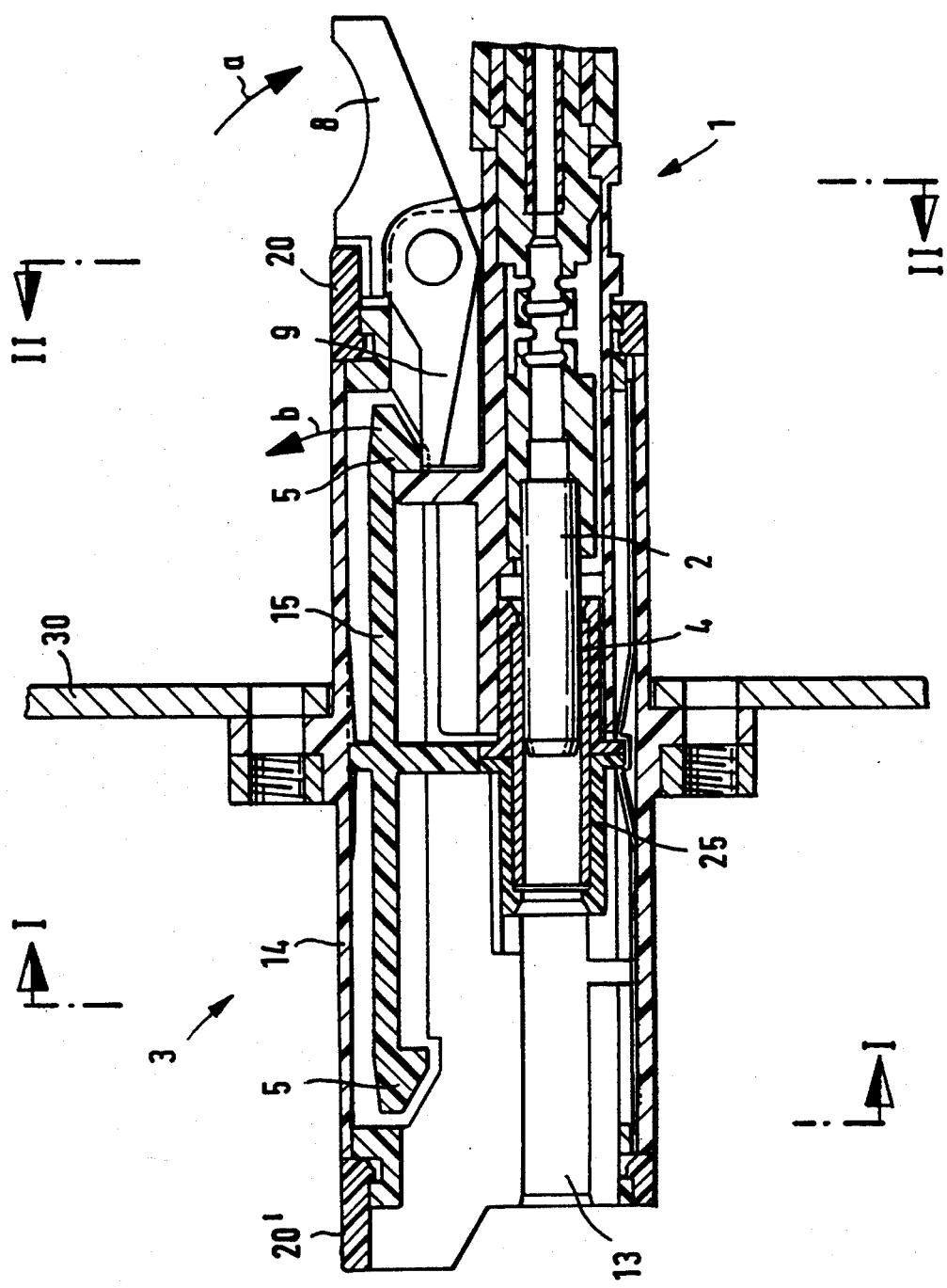
FIG. 4 shows the plug connector according to FIG. 3, in an assembled condition.
Figure 4:
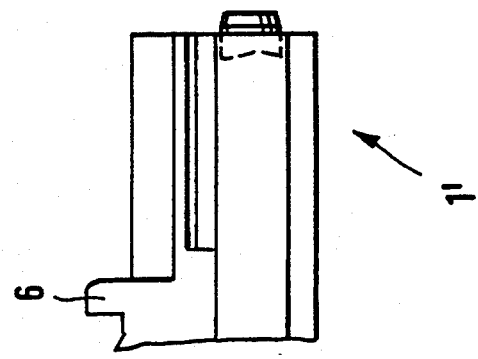

FIGS. 3 and 4 show the individual components more exactly, also the cross section, according to FIGS. 5 and 6, being shown as an additional aid.

It can be seen from FIG. 3 that the sleeve portion 3 actually comprises various components. The inner sleeve housing 13 is, with that, inserted into an outer sleeve housing 14, which for example possesses a flange 28 for affixing to a housing wall 30. The two end sections 20 and 20', which can be snapped onto the inner sleeve housing, serve to secure the inner sleeve housing in the outer sleeve housing. These end sections form snap-on frames, which at the same time carry the encoded security section 17. In this way, different frames with various codes can be plugged into the same sleeve housing. These frames can be respectively coloured to be the same as the associated releasing levers with the corresponding code. In contrast to this, the sleeve housing 14 and the plug housing 12 can always possess the same colour.

The inner sleeve housing 13, however, also accommodates the cylindrical sleeve holder 25 with the actual sleeve 4, which is preferably floatingly mounted. The sleeve holder is inserted into the inner sleeve housing 13 from beneath, through an opening, and held firm in this position by the outer sleeve housing 14. A bow spring 27, which presses the sleeve holder upwards under tension, is clamped in under the sleeve holder 25.

The actual plug portion 1 likewise comprises numerous components. A ferrule holder 29 is mounted, secured against rotation, in the plug housing 12. The actual plug ferrule 2 is affixed in this ferrule holder. This plug ferrule is high precision machined and fits exactly into the sleeve 4 on the receptacle. The optical fibre is held centrally in the plug ferrule 2.

The locking bar 6 is formed in one piece with the plug housing 12, which is slightly inclined in front, for better acceptance of the locking catch 5. The mounting fork 11, which possesses openings for accommodation of the linkage lug 10 in the releasing lever 7, is immediately adjacent to the locking bar. In order to facilitate snapping of the linkage lugs into the fork mounting, the latter is likewise provided with inclinations 31.

Since the releasing lever 7 is also a separate component, releasing levers with varying key sections 16, as with the frames 20, 20', can be manufactured so that in each case, on assembly, it will be decided which plug portion should fit into which receptacle.

FIG. 4 shows the receptacle 3 which is mounted on a housing wall 30. On the right side of the sleeve portion a plug portion 1 has already been inserted. With that, the locking catch 5 is engaged behind the locking bar 6 and the plug ferrule 2 has positioned into the middle of the sleeve 4.

On the left side, the front portion of a plug is visible which has just been inserted. With the precondition that the code on the plug portion and the sleeve portion correspond, the plug can be inserted sufficiently far that the locking catch 5 engages.

If the plug should now be removed from the sleeve portion, a force in the direction of the arrow a must be exerted on the grip piece 8. Through that, the pivot arm 9 lying directly beneath the locking catch 5 moves the locking catch upwards in the direction of the arrow b, until it is raised above the locking bar 6. Obviously, the outer sleeve housing 14 must leave sufficient free space for the locking catch. As soon as the locking catch is disengaged, the plug can be withdrawn from the sleeve portion, just that tensile force being exerted on the sleeve portion, and with that the housing wall 30, which is necessary to overcome the frictional force.

Naturally, other embodiments of the invention are conceivable. For example, each plug portion could be held firm by two opposingly placed locking catches, two releasing levers being then necessary for opening, which must be activated in an opposing sense. In place of pivotable releasing levers, these could be formed in another way, in order to raise the locking catch 5. Approximately laterally arranged buttons would be conceivable, which must be pressed into the housing to raise the locking catch. Also the specific design of the plug portion is not essential to the invention. So, for example, the plug portion could possess an automatically opening protecting cover, or a plug portion could be concerned which carried a plurality of parallel plug ferrules.

Inasmuch as the invention is subject to modifications and variations, the foregoing description and accompanying drawings should not be regarded as limiting the invention, which is defined by the following claims and various combinations thereof:

We claim:

1. Plug connector for an optical fibre with a plug portion (1) which possesses at least one plug ferrule (2) and with a sleeve portion (3) which possesses at least one sleeve (4) for accommodation of the plug ferrule, an engagement device being arranged for securing the plug portion in the sleeve portion, said engagement device possessing at least one sprung locking catch (5) which, with a fully inserted plug portion, is able to engage behind a locking element (6), a releasing lever (7) being arranged next to the locking element (6) with which releasing lever (7) the locking catch (5) is able to be disengaged from the locking element, characterized in that the locking catch (5) is arranged on the sleeve portion (3) and that the releasing lever is a double armed lever, mounted to be able to pivot on the plug portion, with a grip piece (8) and with a pivot arm (9) extending up to the locking element (6).

2. Plug connector according to claim 1, wherein the releasing lever (7) possesses a pair of linkage lugs (10) which are able to be engaged in a mounting fork (11) on the plug portion.

3. Plug connector according to claim 2, wherein the plug portion possesses a plug housing (12) and the locking element and the mounting fork are formed in one piece with the plug housing.

4. Plug connector according to claim 1, wherein the sleeve portion (3) possesses an inner sleeve housing (13) and the locking catch (5) is arranged on a sprung tongue (15) which is formed in one piece with the inner sleeve housing.

5. Plug connector according to claim 1, wherein the releasing lever (7) possesses a key section (16) with a code comprising protrusions and recesses and the key section engages in a security section (17), with a corresponding code, on the sleeve portion, the key section and the security section being so arranged that the locking catch (5) is only able to be engaged in the case of corresponding codes.

6. Plug connector according to claim 4 or 5, wherein the inner sleeve housing (13) is inserted into an outer sleeve housing (14), that the inner sleeve housing is secured in the outer sleeve housing by an end section (20) which is fixed to one of the sleeve housings (13, 14) and this end section is provided with the security section (17).

7. Plug connector according to claim 6, wherein the end section is a snap-on frame (20) which is able to be snapped onto the inner sleeve housing (13).

8. Plug connector according to claim 1, wherein the sleeve portion (3) is a middle adaptor into which a plug portion is able to be slid in from both sides and that a locking catch is arranged for each plug portion.

9. An optical fiber connector having a plug portion comprising at least one plug ferrule and a receptacle having a socket for receiving the ferrule, the receptacle comprising an engagement device for securing the plug portion in the receptacle, said device having at least one sprung locking catch which, when the plug is fully inserted, engages behind a locking element on the plug, a release lever arranged next to the locking element and adapted to disengage the locking element, the locking catch being mounted on the receptacle, and the release lever being a double armed lever, pivotally mounted on the plug portion, having a pivot arm extending to and adapted to engage the locking element, and a grip piece for disengaging the pivot arm.

10. A connector according to claim 9, further comprising a mounting fork on the plug portion, and wherein the release lever comprises a pair of linkage lugs engageable in the fork.

11. A connector according to claim 10, wherein the plug portion includes a plug housing and the locking element and the mounting fork are formed integrally with the plug housing.

12. A connector according to claim 9, where the receptacle has an inner sleeve housing and the locking catch is arranged on a spring tongue formed integrally with the inner sleeve housing.

13. A connector according to claim 9, wherein the release lever has a key section comprising protrusions and recesses forming a code, and further comprising a security section also coded by recesses and protrusions, the key section and the security section being arranged so that the locking catch can be engaged only when said codes correspond.

14. A connector according to claim 13, wherein said receptacle further comprises an outer sleeve housing and the inner sleeve housing is inserted into the outer sleeve housing and secured therein by an end section which is fixed to one of the sleeve housings, said end section including said security section.

15. A connector according to claim 14, wherein the end section and said inner sleeve housing have a snap-together connection.

16. A connector according to claim 9, wherein the receptacle is adapted to receive two plug portions, one at either end of the receptacle, and further comprising two locking catches, one for each plug portion.

* * * * *